United States Patent
Omeis et al.

(10) Patent No.: US 9,574,121 B2
(45) Date of Patent: *Feb. 21, 2017

(54) AMINE ADDUCTS BASED ON EPOXIDE COMPOUNDS

(71) Applicant: BYK-Chemie GMBH, Wesel (DE)

(72) Inventors: Jürgen Omeis, Dorsten-Lembeck (DE); Stefan Mössmer, Hamminkeln (DE); Andrea Esser, Wesel (DE); Monika Roch, Dinslaken (DE); Wolfgang Pritschins, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 6 days.

This patent is subject to a terminal disclaimer.

(21) Appl. No.: 14/358,462

(22) PCT Filed: Nov. 15, 2012

(86) PCT No.: PCT/EP2012/004737
§ 371 (c)(1),
(2) Date: May 15, 2014

(87) PCT Pub. No.: WO2013/072053
PCT Pub. Date: May 23, 2013

(65) Prior Publication Data
US 2015/0299538 A1   Oct. 22, 2015

(30) Foreign Application Priority Data

Nov. 18, 2011 (EP) .................... 11009170

(51) Int. Cl.
| C08L 67/00 | (2006.01) |
|---|---|
| C09J 167/04 | (2006.01) |
| C08G 63/685 | (2006.01) |
| C08G 63/91 | (2006.01) |
| C09D 7/12 | (2006.01) |
| C09D 11/30 | (2014.01) |
| C09D 17/00 | (2006.01) |
| C09D 167/04 | (2006.01) |
| C08L 67/04 | (2006.01) |

(52) U.S. Cl.
CPC .......... *C09J 167/04* (2013.01); *C08G 63/685* (2013.01); *C08G 63/6854* (2013.01); *C08G 63/912* (2013.01); *C08G 63/914* (2013.01); *C09D 7/125* (2013.01); *C09D 11/30* (2013.01); *C09D 17/00* (2013.01); *C09D 167/04* (2013.01); C08L 67/00 (2013.01); C08L 67/04 (2013.01); C08L 2666/34 (2013.01); C08L 2666/36 (2013.01)

(58) Field of Classification Search
None
See application file for complete search history.

(56) References Cited

U.S. PATENT DOCUMENTS

| 13,807 | A | 11/1855 | Wicks |
|---|---|---|---|
| 4,777,195 | A | 10/1988 | Hesse et al. |
| 4,795,796 | A | 1/1989 | Haubennestel et al. |
| 4,963,275 | A | 10/1990 | Gutierrez et al. |
| 5,100,969 | A | 3/1992 | Yamamoto et al. |
| 5,187,229 | A | 2/1993 | Yamamoto et al. |
| 6,111,054 | A | 8/2000 | Haubennestel et al. |
| 6,194,539 | B1 | 2/2001 | Matsui |
| 6,583,213 | B1 | 6/2003 | Fawkes et al. |
| 8,202,935 | B2 | 6/2012 | Alzer et al. |
| 2014/0296430 | A1 | 10/2014 | Pritschins et al. |
| 2014/0312280 | A1 | 10/2014 | Pritschins et al. |
| 2015/0299538 | A1 | 10/2015 | Omeis et al. |

FOREIGN PATENT DOCUMENTS

| CN | 1820834 A | 8/2006 |
|---|---|---|
| EP | 0 336 664 A2 | 10/1989 |
| EP | 0 713 894 A2 | 5/1996 |
| EP | 0 893 155 B1 | 4/2004 |
| EP | 1 080 127 B1 | 1/2006 |
| JP | 6312335 A | 1/1988 |
| JP | 63-165431 A | 7/1988 |
| JP | 02-048029 A | 2/1990 |
| JP | 2048029 A | 2/1990 |
| JP | H02-56230 A | 2/1990 |
| JP | H02-107327 A | 4/1990 |
| JP | H 8-38875 A | 2/1996 |
| JP | H 8-143651 A | 6/1996 |
| JP | H 9-157374 A | 6/1997 |
| JP | 2002-088334 A | 3/2002 |
| JP | 2008-231135 A | 10/2008 |
| JP | 2011-202040 A | 10/2011 |
| WO | WO 99/55763 A1 | 11/1999 |
| WO | WO 2007/114152 | 10/2007 |
| WO | WO 2013/072052 A1 | 5/2013 |
| WO | WO 2013/072054 A1 | 5/2013 |

OTHER PUBLICATIONS

English translation of JP 02-48029.*
PCT/EP2012/004737—International Search Report, Apr. 4, 2013.
PCT/EP2012/004737—Written Opinion of the International Searching Authority, Apr. 4, 2013.
PCT/EP2012/004737—International Preliminary Report on Patentability, Nov. 5, 2013.

* cited by examiner

*Primary Examiner* — Ana Woodward
(74) *Attorney, Agent, or Firm* — Curatolo Sidoti Co., LPA; Joseph G. Curatolo; Salvatore A. Sidoti

(57) ABSTRACT

The invention relates to a process for preparing an amine adduct, in which a polyamine component (A), a polyester component (B) and a hydrocarbon component (C) are reacted. The amine adduct is of particularly good suitability as a wetting agent and dispersant, especially for coatings and plastics applications.

22 Claims, No Drawings

AMINE ADDUCTS BASED ON EPOXIDE COMPOUNDS

CROSS REFERENCE TO RELATED APPLICATIONS

This application is a national stage application of International Application No. PCT/EP2012/004737, filed 15 Nov. 2012, which claims priority from European Patent Application No. 11009170.9, filed 18 Nov. 2011, from which applications priority is claimed, and which are incorporated herein by reference.

The present invention relates to a process for preparing an amine adduct, the amine adduct, the use of the amine adduct, a mixture of solids as well as a lacquer and a plastic.

Wetting agents that exist in a form dissolved or dispersed in a liquid reduce the surface tension or the interfacial tension and thus increase the wetting capacity of the liquid. In this way, in many instances, wetting agents make surface wetting possible that otherwise would not occur.

Dispersants are generally suitable for stabilizing solid particles in binders, lacquers, pigment pastes, plastics and plastic mixtures, adhesives and sealants, for reducing the viscosity of appropriate systems, and for improving flow properties. Dispersion stabilizers are used for stabilizing previously produced dispersions.

Large mechanical forces are needed for introducing solids into liquid media. It is customary to introduce dispersants to reduce the dispersion forces and to minimize the total energy input into the system for deflocculating the solid particles and thus also keeping the dispersion time as low as possible. Such dispersants are surface-active substances that are anionic, cationic and/or neutral in structure. Small quantities of these substances are either applied directly to the solid or added to the dispersion medium. It should be noted that even after complete deflocculation of the solids agglomerates into primary particles (following the dispersion process), reagglomeration may occur, partially or completely undoing the effort of dispersion. As a result of insufficient dispersion or reagglomeration, unwanted effects frequently occur, such as viscosity increases in liquid systems, color drift and loss of luster in lacquers or coatings and reduction of the mechanical stability and material homogeneity in plastics.

In practice, various types of compounds come under consideration as wetting agents and dispersants. This is especially due to the fact that a large number of different systems exists, which are based in particular on various binders in combination with different particles to be dispersed, such as pigments, fillers and fibers.

EP-B-1 080 128 relates to special amino groups and poly(oxyalkylenecarbonyl) chain-containing dispersants which are produced through a Michael addition reaction in which a starting compound is bound to an ethylenically unsaturated group of a "Michael Acceptor" containing a poly(oxyalkylenecarbonyl) chain.

To be sure, dispersants of this type are fundamentally suitable for the dispersion of solids, but they have only a limited universality, especially in regard to the solids to be dispersed, which restricts their suitability for different dispersion tasks.

The present invention was thus based on the task of supplying a process for preparing high-quality dispersant additives that are as nearly universally usable as possible.

The solution to this problem is a method for preparing an amine adduct in which the reaction of a polyamine component (A), a polyester component (B) and a hydrocarbon component (C) in weight ratios of
(A):(B)=1:100 to 1:4 and
(A):(C)=1:10 to 10:1
is performed in that according to reaction variants
  i) first a reaction intermediate (A-B) is produced from the polyamine component (A) and the polyester component (B)
     and this is then reacted with the hydrocarbon component (C) or
according to reaction variant
  ii) first a reaction intermediate (A-C) is formed from the polyamine component (A) and the hydrocarbon component (C) and this is subsequently reacted with the polyester component (B) or
according to reaction variant
  iii) first the polyamine component (A) is reacted simultaneously with the polyester component (B) and the hydrocarbon component (C),
wherein the polyamine component (A) is present in the form of organic polyamine compounds (A'), which in each case have at least three amino groups (A'+) selected from primary and secondary amino groups in each case reactive with both the polyester component (B) and the hydrocarbon component (C),
the polyester component (B) is present in the form of polyester compounds (B'), which in each case contain no primary amino groups and which in each case no secondary amino groups, in each case have at least three ester groups, and in each case contain a coupling group (B'+) present as a carboxyl group or carboxylic acid anhydride group, reactive with primary and/or secondary amino groups, and
the hydrocarbon component (C) is present in the form of branched or unbranched, saturated or unsaturated hydrocarbon compounds (C') each having a linking group (C'+), in each case having no primary amino groups, in each case having no secondary amino groups, in each case having no carboxyl groups and no carboxylic acid anhydride groups, and in each case having an overall ratio of carbon atoms to hetero atoms selected from the group of elements O, N, P, S, [and] Si of at least 2:1, wherein the linking groups (C'+) in each case have the characteristic of reacting with primary amino groups with formation of secondary amino groups and/or with secondary amino groups with formation of tertiary amino groups, and also in each case are present
in the form of an epoxy function of general formula (I)

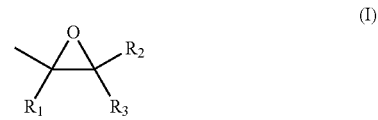

with
  $R_1$, $R_2$, and $R_3$ in each case the same or different and in each case independently represented by H and/or by a saturated, branched or unbranched $C_1$-$C_{12}$ hydrocarbon moiety.

The polyamine component (A) represents the totality of all polyamine compounds (A') (which may be the same or different), wherein the reactive amino groups (A'+) in each case are molecular components of the polyamine compounds (A').

Correspondingly, the polyester component (B) consists of the totality of all hydrocarbon compounds (B') (which may be the same or different), wherein the coupling groups (B'+) in each case are molecular constituents of the polyester compounds.

The hydrocarbon group (C) represents the totality of all hydrocarbon compounds (C') (which may be the same or different), wherein the linking groups (C') in each case are molecular constituents of the hydrocarbon compounds (C').

According to reaction variant i), at least initially (at the beginning of the reaction), but often up to complete reaction of (B), (B) is reacted with (A) with formation of (A-B), specifically without (C) simultaneously reacting with (A) (or with the secondary product of (A)). Then (A-B) is reacted with (C), wherein this can optionally also take place in the presence of (B) (simultaneous reaction of (A-B with (B) and (C)).

According to reaction variant ii), at least initially (at the beginning of the reaction), but often up to complete reaction of (C), (C) is reacted with (A) with formation of (A-C), specifically without (b) simultaneously reacting with (A) (or with the secondary product of (A)). Then (A-C) is reacted with (B), wherein this may also optionally take place in the presence of (C) (simultaneous reaction of (A-C) with (B) and (C)).

According to reaction variant iii), at least initially (at the beginning of the reaction), but often over the entire reaction period, (A) is reacted simultaneously with (BO and (C).

The wording "same or different" is intended to mean that the respective moiety, substituent or constituent of the molecule can vary both within a (macro)molecule and also between different (macro)-molecular species of the same general formula.

The amine adduct according to the invention is normally present as a (an industrial) raw product, which can optionally contain solvents, byproducts and unreacted starting components.

It should be emphasized that the amine adducts according to the invention exhibit a good dispersing effect toward broad spectrum of solids to be dispersed. This is manifested, among other things, in the fact that not only particularly solids with basic surfaces, but also solids with neutral and even acidic surfaces can be dispersed effectively.

The amine adducts are therefore of particularly high quality and are universally usable as wetting and dispersing agents. It can also be stated that the amine adducts according to the invention can be used successfully in both polar and nonpolar binder systems, and in this case exhibit excellent tolerability as wetting and dispersion agents and also as dispersion stabilizers. This guarantees successful use in combination with a great variety of binders and coating materials. In addition, the amine adducts according to the invention permit flocculation-free miscibility of pastes, especially pigment pastes, and the binders produced with these pastes. Furthermore the amine adducts according to the invention are suitable as dispersion stabilizers, especially as emulsion stabilizers. Through the use of the amine adducts according to the invention, the viscosity of the ground material introduced during the dispersion is markedly reduced, and in this way it enables the production of formulations which have a high solids content. In this way, the fraction of (volatile) solvents can be reduced to provide for better environmental safety. In summary, it can be said that the amine adducts according to the invention, while providing good stabilization of pigments or fillers, can lower the viscosity of the ground material in the lacquers, pastes or plastics formulations produced to such an extent that processing at a high degree of filling can be achieved without having a negative effect on the durability of the hardened lacquers. It is also essential that the amine adducts according to the invention, used as additives, should be highly effective even at low concentrations. Furthermore, good shelf life of the amine adducts according to the invention should be mentioned. Finally it should be mentioned that the amine adducts according to the invention can be produced economically and are based on widely available starting materials.

In a preferred embodiment of the invention, the polyester component (B) and the hydrocarbon component (C) under the reaction conditions of the reaction do not react with one another. This is also desired, as a rule, for all species corresponding to (B) and (C).

The polyester component (B) and the hydrocarbon component (C), however, can optionally react to a slight extent under the reaction conditions of the reaction if these starting components are simultaneously present in the reaction mixture. This is known to the person skilled in the art, since the epoxy function intended for linking the hydrocarbon component (C) is markedly reactive, so that in practice secondary reactions make take place (although they are unwanted and occur only to a slight extent. By suitably selecting the reaction conditions, the secondary reactions mentioned can be suppressed to a level where they do not interfere or completely.

According to a special reaction variant iv) the polyamine component (A), the polyester component (BO and the hydrocarbon component (C) can be reacted, with the specification, in quantitative ratios varying over time, that at least the first time segment of the reaction takes place according to one of reaction variants i) to iii).

Reaction variant iv) thus takes place at least (in a first time segment) according to one of the reaction variants i) to iii) and is thus to be regarded as a special case of one of the reaction variants i) to iii). The reaction of (C) and (C) takes place, according to reaction variant iv), in quantitative ratios that vary over time. For example, the reaction takes place in at least three steps, in that (A) or appropriate secondary products of (A) are reacted in successive time segments in each case with either B or C.

In a preferred embodiment of the invention, the reaction of (A), (B) and (C) is performed in weight ratios of
(A):(B)=1:25 to 1:7 and
(A):(C)=1.2 to 2:1.

A low fraction of (A) often results in low adsorption on the surfaces of solids, while a high fraction of (A) can often mean poor solubility and difficult handling.

REGARDING THE POLYAMINE COMPONENT (A)

Examples of suitable polyamine compounds (A') of the polyamine component (A) are aliphatic linear polyamines, such as diethylenetriamine (DETA), triethylenetetramine (TETA), tetraethylenepentamine (TEPA), pentaethylenehexamine, hexaethyleneheptamine and higher homologs, higher linear condensates with the general formula of $NH_2$—$(C_2H_4NH)_n$—$C_2H_4$—$NH_2$ with n>5, dipropylenetriamine, (3-(2-aminoethyl)aminopropylamine, N,N-bis(3-aminopropyl)methylamine, tetramethyliminobispropylamine, N,N-dimethyldipropylenetriamine, bis-(3-dimethylaminopropyl) amine and N,N'-bis(3-aminopropyl)-ethylenediamine.

Frequently, the polyamine component (A) is present in the form of organic polyamine compounds (A'), which in each contain at least 2, preferably in each case 6-600, tertiary amino groups.

Tertiary amino groups typically cause good adsorption on surfaces of solids and a slight tendency to secondary reactions. In addition, the tertiary amino groups enable high-molecular-weight structures, whereas the viscosity remains relatively low.

Typically, branched aliphatic polyamines, especially poly($C_2$-$C_4$)-alkyleneamines, with primary, secondary and tertiary amino groups are used. Particularly are the aziridine homopolymers also known under the name of polyethyleneimines, for example the Lupasol® types from BASF or the Epormin® types from Nippon Shokubai. These are produced by known methods, e.g., by the polymerization of ethyleneimine.

Usually in the organic polyamine compounds (A') the molar ratio of primary to secondary amino groups in each case amounts to 1:1 to 1:5 and the molar ratio of primary to tertiary amino groups in each case amounts to 3:1 to 1:3.

Primary amines are more reactive than secondary amines, so that a small fraction of primary amines can mean a low reactivity toward the build-up reaction.

As a rule, the totality of the organic polyamine compounds (A') have a weight-average molecular weight of 250 to 200,000, preferably 600 to 40,000, and particularly preferably 800 to 10,000 g/mol.

A low molecular weight often causes weak adsorption on the surfaces of solids, while a high molecular weight can be problematic in terms of manageability and solubility.

If nothing is said to the contrary at the location in question, statements regarding the weight-average molecular weight in connection with the present invention generally are based on the light-scattering measurement method.

In addition to unmodified polyamines, partially modified polyamines, as described in EP-0 893 155, may also be used. These modified polyamines, for example, may relate to condensates of the above-described polyamines with carboxylic acids such as stearic acid, oleic acid or tall oil fatty acid bound to the polyamine by way of amide groups. It is also possible to react parts of the primary or secondary polyamine with monoisocyanates such as stearylisocyanate and/or polyisocyanates.

An additional suitable class of polyamines is homo-, co- or block copolymers with at least three primary or secondary amino groups, which can be produced by either free moiety or ionic polymerization, or formed by means of a polymer-analogous reaction on a preformed polymer or introduced into such [a polymer]. Homo-, co- or block copolymers of this type have a weight-average molecular weight of up to 1,000,000 g/mol, preferably form 600 to 200,000 g/mol. The polyamines in question can be used individually or in a mixture.

REGARDING THE POLYESTER COMPONENT (B)

Examples of suitable polyester compounds (B') of the polyester component (B) are compounds produced by reacting dicarboxylic acids and their esterifiable derivatives such as anhydrides, acid chlorides or dialkyl esters, such as dimethyl esters or diethyl esters, by reacting with diols and monofunctional carboxylic acids. If necessary, the formation of dihydroxypolyesters can be suppressed by the use of corresponding stoichiometric quantities of monofunctional carboxylic acids. The esterification can be performed in bulk or by azeotropic esterification in the presence of an entrainment agent. Such condensation reactions are performed, for example, at temperatures from about 50° C. to 250° C. Examples of dicarboxylic acids that can be used in this way are succinic acid, maleic acid, fumaric acid, glutaric acid, adipic acid, sebacic acid, pimelic acid, phthalic acid or dimerized fatty acids and their isomers as well as their hydrogenation products. Examples of diols that can be used in this way are: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol, and polyglycols based on ethylene glycol and/or propylene glycol. Corresponding monocarboxylic acids used as starting components preferably have 1 to 42, especially 4 to 18, preferably 8 to 14 carbon atoms and can be saturated or unsaturated, aliphatic or aromatic, linear, branched and/or cyclic. Examples of corresponding, suitable monocarboxylic acids are stearic acid, isostearic acid, oleic acid, lauric acid and benzoic acid. Additional suitable acids are the tertiary monocarboxylic acids, also known as Koch acids, such as 2,2-dimethylpentanoic acid, tert-nonanoic acid and neodecanoic acid. Koch acids of this type are also known as commercial products under the names of Versatic® acids (Shell), Neo-acids (Exxon) or CeKanoic acids (Kuhlmann). The Versatic® acids are named according to the total number of carbon atoms that the molecule contains. Suitable examples are the Versatic® acids 5, 6, 9, 10, 913 [and] 1019.

The polyester component (B) is usually present in the form of polyester compounds (B'), each of which contains at least 5, preferably in each case 6 to 70, ester groups.

Ester groups typically improve the solubility.

According to special embodiments of the invention, the polyester compounds (B') additionally contain ether groups.

Each of the polyester compounds (B') preferably contains at least one reactive coupling group (B'+), preferably reactive, wherein each of the polyester compounds (B') preferably contains no additional functional groups that react with the polyamine component (A) during the reaction.

Monofunctionality is desired to avoid cross-linking, which usually leads to deterioration of solubility, reduced compatibility, excessive viscosities or inadequate compatibility.

Often at least 50% by weight, preferably 70 to 100% by weight, of the polyester compounds (B') used are present in the form of linear, monocarboxy-functional caprolactone polyesters, which each preferably has a weight-average molecular weight of 500 to 10,000, preferably of 800 to 8,000.

Weight-average molecular weights of less than 500 or more than 10,000 often impair the universal compatibility.

Particularly suitable polyesters are those that can be obtained by polycondensation of one or more, optionally alkyl-substituted, hydroxycarboxylic acids such as ricinoleic acid or 12-hydroxystearic acid and/or ring-opening polymerization of the corresponding lactones, such as propiolactone, valerolactone, and caprolactone. The lactone polymerization is performed using known methods, initiated with, for example, p-toluenesulfonic acid or dibutyltin dilaurate, at temperatures from about 50° C. to 200° C. Particularly preferred are polyesters on the basis of ε-caprolactone, optionally in combination with δ-valerolactone.

REGARDING THE HYDROCARBON COMPONENT (C)

Preferably the hydrocarbon compounds (C') of the hydrocarbon component (C) each have exactly one linking group (C'+) and preferably do not contain any additional functional groups that react with the polyamine component (A) during the reaction.

The monofunctionality reduces the tendency toward cross-linking, which generally leads to poor solubility, poor compatibility and excessive viscosities. According to the invention, all of the linking groups (C'+) are present respectively in the form of epoxy functions of general formula (I).

Preferably in the general formula (I) for the linking groups (C'+), $R^1$, $R^2$ and $R^3$ are each represented by H.

Typically, the hydrocarbon compounds (C') of the hydrocarbon component (C) each contains a total of 6 to 70 carbon atoms.

A number of less than 6 carbon atoms often results in excessive polarity, while more than 70 carbon atoms usually impairs the universal compatibility.

In a special embodiment of the invention, the hydrocarbon component (C) contains at least 30% by weight, preferably 50 to 100% by weight, of unsaturated $C_6$-$C_{50}$ hydrocarbon compounds (C'), which in each case contains at least one aryl and/or alkylaryl moiety.

Aromatic groups frequently give the products a particularly good adsorption capability toward many particle surfaces.

In a particular variant of the invention, the hydrocarbon component (C) contains at least 30% by weight, preferably 50 to 100% by weight, of unsaturated $C_{10}$-$C_{70}$ hydrocarbon compounds (C'), which in each case contains at least one branched alkyl and/or one branched alkenyl moiety.

Branched groups often result in better solubility and generally promote universal compatibility.

Frequently, the hydrocarbon compounds (C') of the hydrocarbon component (C) in each case contain a total of 6 to 24 carbon atoms and additionally a maximum of three hetero atoms from the group of elements O, N, P, S, Si. According to the invention, other hetero atoms (aside from the last-mentioned ones) are preferably not present (in (C').

Preferably, components (A), (B) and (C) are used respectively in stoichiometric ratios such that altogether at least 50 mol %, preferably 70 to 100 mol % of the totality of the reactive amino groups (A'+) of the polyamine compounds (A') used are reacted with the polyester compounds (B') and/or with the hydrocarbon compounds (C').

Corresponding conversion rates less than 50% usually signify products with a large number of reactive amino groups, which have a tendency toward undesirable secondary reactions. As a result, product discolorations, reduced pot lives and less advantageous storage stabilities are encountered.

A partial quantity (preferably less than 50 mole-%, particularly less than 30 mole-%) of the reactive amino groups (A'+) of the polyamine compounds (A') can (among other things) be made to react with carbonate compounds (D') of a carbonate component (D) and/or with carboxylic acid compounds (F') of a carboxylic acid component (F). Compounds belonging to the groups (D) or (F) by definition are not species that can be assigned to (A), (B) or (C).

Components (D) and (F) in each case may further increase the universality.

By reacting a partial quantity of the primary and secondary amino groups of the polyamines (A) with component (D) and/or component (F), additional modifications are made possible to optimize further adaptations to special systems.

Suitable carbonates in this connection are aliphatic, cycloaliphatic and/or aromatic carboxylic acid esters, such as dialkyl carbonates, e.g., dimethyl carbonate, diethyl carbonate or diphenyl carbonate, catechol carbonate or cyclic alkylene carbonates. Particularly suitable are cyclic alkylene carbonates with 5- or 6-membered rings, which may optionally be substituted. Suitable substituents are aliphatic, cycloaliphatic and/or aromatic groups with up to 30 carbon atoms. Examples of corresponding suitable alkylene carbonates are ethylene carbonate, propylene carbonate, glycerol carbonate, trimethylene carbonate, 4-methyltrimethylene carbonate, 5-methyltrimethylene carbonate, 5,5-dimethyl trimethylene carbonate, 5,5-diethyl trimethylene carbonate or 5-methyl-5-propyltrimethylene carbonate.

Suitable carboxylic acids and carboxylic acid anhydrides are aliphatic, cycloaliphatic and/or aromatic carboxylic acids and the anhydrides thereof, such as acetic acid, propionic acid, benzoic acid, nitrobenzoic acid, acetic anhydride, succinic anhydride, maleic anhydride, phthalic anhydride, tetrahydrophthalic anhydride, alkyltetrahydrophthalic anhydride, hexahydrophthalic anhydride, alkyl-hexahydrophthalic anhydride, trimellitic anhydride, alkenyl- and/or alkyl-succinic anhydride with preferably 1 to 20 carbon atoms in the alkenyl or alkyl chains.

Frequently the amine adduct at room temperature is obtained in solid form, wherein (B) to (C) is reacted in a weight ratio of 2:1 to 50:1 and the amine adduct has a melting range of 30 to 200° C. However, the amine adduct may also be obtained in liquid form.

However, the solid form permits use for applications for which exclusively solid additives can be used. For example, applications for thermoplastic processing may be mentioned. Weight ratios outside of the above-mentioned range can impair the universality, wherein other melting ranges can correspondingly interfere with the manageability.

The manufacturing of the compounds according to the invention, depending on their viscosity, may be performed in bulk or in the presence of suitable solvents, solvent mixtures or other suitable carrier media. Suitable solvents are all those that are not reactive under the reaction conditions selected or the reactivity of which toward the reaction partners is negligible and in which the reactants and the reaction products are at least partially soluble. These include, for example, hydrocarbons such as toluene, xylene, aliphatic and/or cycloaliphatic gasoline fractions, chlorinated hydrocarbons such as chloroform, trichloroethane, cyclic and acyclic ethers such as dioxane, tetrahydrofuran, polyalkylene glycol diethyl ethers such as dipropylene glycol dimethyl ether, esters of mono-, di- or polycarboxylic acids such as ethyl acetate, butyl acetate, butyrolactone, dimethyl-2-methylglutarate, triacetin, phthalates or other plasticizers, di- or polycarboxylic acid esters, dialkyl esters of $C_2$-$C_4$ dicarboxylic acids, alkylglycol esters such as ethylglycol acetate, methoxypropyl acetate, ketones such as methylisobutylketone, cyclohexanone, acetone, acid amides such as dimethylformamide, N-methylpyrrolidone and the like. Advantageously, the solvent or solvents or the carrier media are already selected with the planned application area in mind. For example, for compounds according to the invention for use in water-dilutable lacquer systems or for distribution of pigments in aqueous suspensions after pigment synthesis, solvents are preferably used which are completely or partially water-dilutable. For example, if the products are to be used where the presence of volatile organic compounds (VOC) is not desired, the formulation should be solvent-free insofar as possible or should be present in appropriate carrier materials that can be considered VOC-free.

Depending on the area of application, the solvents used for synthesis can remain in the reaction mixture or are removed completely or partially and optionally can be replaced by other solvents or carrier media.

For example, the solvent can be removed partially or completely by distilling off, optionally under reduced pressure and/or azeotropically under addition of water. The active substance can also be isolated by precipitation by addition of nonsolvents such as aliphatic hydrocarbons, for example hexane, followed by separation by filtration and, if desired, drying. The active substance obtained according to one of these methods can then be dissolved in a solvent suitable for the respective area of application or optionally be used in pure form, for example in powder lacquers, or applied to inert carriers. For applications in which the use of solids is preferred, such as powder lacquers or certain plastics processing methods, the compounds can also be converted into a solid form by additional known methods. Examples of such methods are microencapsulation, spray drying, adsorption on a solid support such as $SiO_2$ or the PGSS method (Particle from Gas Saturated Solutions).

The invention also relates to an amine adduct that can be produced by one of the above-mentioned methods.

The amine adduct according to the invention is preferably suitable as a wetting agent and dispersing agent, especially for lacquer and plastics applications.

Typically, the amine adduct according to the invention has a weight-average molecular weight of 5,000 to 100,000.

The amine adduct according to the invention frequently has a spherical (micro)structure, which in each case contains a hyperbranched polyalkyleneimine core, to the outer shell of which polyester groups and hydrocarbon groups are bound.

Furthermore, the present invention relates to the use of the above-described amine adduct or the amine adduct that can be produced according to the above-described process as an additive, preferably, in coatings, especially in lacquers, in plastics, in pigment pastes, in sealants, in cosmetics, in ceramics, in adhesives, in casting compounds, in pigment-containing compounds of flat-screen technology, in filling compounds, in printing inks and in inks, preferably in lacquers.

In this application, the amine adduct is preferably used as a wetting and dispersing agent.

The present invention also relates to a mixture of solids containing particles and/or fibers that have been treated with the above-described amine adduct.

Finally, the present invention also relates to a lacquer and/or plastic containing the above-described amine adduct.

The amine adducts according to the invention may be used, for example, as aluminum passivators, dispersants, dispersion stabilizers or wetting agents and can be employed for example in pigmented and/or filler-containing products, for example pigment concentrates or pastes, coating compositions, sealants, plastics, ceramics, cosmetics, adhesives, potting compounds, filling compounds, printing inks and/or inks. Preferred are pigment concentrates that can be mixed with corresponding lacquer forming systems, yielding pigmented lacquers.

For example, these can be used in the manufacturing or processing of lacquers, printing inks, inks, for example for ink-jet printing, paper coatings, leather and textile dyes, pastes, pigment concentrates, ceramics, adhesives and sealants, potting compounds, plastics and cosmetic preparations, especially if these contain solids such as pigments and/or fillers. These can also be used in the manufacturing or processing of molding compositions on the basis of synthetic, semisynthetic or natural macromolecular substances, such as polyvinyl chloride, saturated or unsaturated polyesters, polyurethanes, polystyrenes, polyacrylates, polyamides, epoxy resins, [and] polyolefins such as polyethylene or polypropylene. For example, the compounds may be used for producing potting compounds, casting compounds, PVC plastisols, gelcoats, polymer concrete, circuit boards, industrial lacquers, wood and furniture lacquers, vehicle lacquers, ship paints, anticorrosion paints, can-coatings and coil-coatings or art paints and engineering paints.

The amine adducts according to the invention can not only be used in lacquer application systems for pigmented lacquers. It is also possible to use them in a broad range of formulations or products, such as resins, oils, fats, lubricants, rubber materials, sealants, printing inks, inks, adhesives, waxes or coating material compositions. The concentrates can also be used in formulations that may be manufactured in the body care industry or for electrical uses in the electronics industry, in the shipbuilding industry, in medical applications, in the construction industry or in the automotive industry. Examples include electronic paper, such as the display on e-books, the encapsulation of microelectronic chips and circuit boards, underwater ship hull coatings, such as anti-fouling coatings, silicone tubing or lubricants for brake components.

The amine adducts according to the invention can also be used advantageously in producing color filters for liquid crystal displays, liquid crystal screens, color resolution devices, sensors, plasma screens, displays based on SED (Surface conduction Electron Emitter Display) and for MLCC (Multi Layer Ceramic Compounds). MLCC technology is used in manufacturing microchips and circuit boards.

Application in cosmetic preparations can serve, for example, for manufacturing cosmetic preparations such as make-up, powder, lipstick, hair colorings, creams, nail polish and sunscreen preparations. These can exist in their usual forms, for example as W/O or O/W emulsions, solutions, gels, creams, lotions or sprays. The compounds according to the invention can be used advantageously in dispersions for producing these preparations. These can contain carrier media commonly used for such purposes in cosmetics, such as water, castor oil or silicone oil and solids, such as organic and inorganic pigments, such as titanium dioxide or iron oxide.

Also to be mentioned are the application areas of NIP (noniimpact printing), InkJet (on paper, film, ceramic, artificial and natural fiber materials), dispersion of ceramics (aqueous or waterless), [and] dispersion in potting compounds. The amine adducts according to the invention can also be used as such, i.e., without first being incorporated in a corresponding concentrate, in the aforementioned formulations and application areas.

Typically the product containing the amine adduct and pigment- and/or filler-containing product is a lacquer, or a pigment concentrate for coating compositions. Ultimately, however, the use of the amine adducts in any pigment-containing and/or filler-containing products whatsoever is possible.

In particular, the pigment concentrates are compositions which, in addition to the amine adducts according to the invention, contain, for example, organic solvents and at least one pigment. In particular, these contain no or only small quantities of organic polymers as binder. Such known binders are advantageously present in the corresponding lacquer application systems and will be described in the following.

Organic solvents used, in particular, are the typical organic solvents, familiar to the person skilled in the art, used in the area of the lacquer and paint industry, such as aliphatic solvents, cycloaliphatic solvents, aromatic solvents, such as toluene, xylene, solvent naphtha, ethers, esters and/or ketones, for example butylglycol, butyldiglycol, butyl acetate, methylisobutyl ketone, methylethyl ketone and/or dissolvers such as methoxypropyl acetate, [and] diacetone alcohol.

Pigments used may include the pigments known to the person skilled in the art. Examples of pigments are mono-, di-, tri- and polyazo pigments, oxazine, dioxazine, [and] thiazine pigments; diketo-pyrrolo-pyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone, [and] perylene pigments and other polycyclic carbonyl pigments, inorganic pigments, such as carbon black pigments and/or pigments based on lamp black, graphite, zinc, titanium dioxide, zinc oxide, zinc sulfide, zing phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, [and] aluminum (for example nickel titanium yellow, bismuth-vanadate-molybdate yellow or chromium-titanium yellow), magnetic pigments based on pure iron, iron oxides and chromium oxides or mixed oxides, metal effect pigments made of aluminum, zinc, copper or brass and pearlescent pigments or fluorescent and phosphorescent luminescent pigments. Additional examples are nano-scale organic or inorganic solids with particle sizes of less than 100 nm in at least one dimension, such as certain lamp black types or other allotropic forms of carbon, for example single-wall CNTs, multi-wall CNTs and graphene. The determination of the particle size is performed, for example, by transmission electron microscopy, analytical ultracentrifugation or light scattering methods. Also to be mentioned are particles consisting of a metal or semimetal oxide or hydroxide, as well as particles consisting of mixed metal and/or semimetal oxides or hydroxides. For example, the oxides and/or oxide-hydroxides of aluminum, silicon, zinc, titanium, etc., can be used for producing such extremely fine particulate solids. The manufacturing process of these oxidic and hydroxidic or oxyhydroxidic particles can take place through a great variety of methods such as ion exchange processes, plasma processes, sol-gel methods, precipitation, size reduction (for example by grinding), or flame hydrolysis. All of the aforementioned pigments can exist in surface-modified form and have basic, acidic or neutral groups on the surface.

If the respective products, especially the coating compositions, contain fillers, they are, for example, fillers known to the person skilled in the art. Examples of powdered and fibrous fillers are, for example, those that are made up of powdered or fibrous particles of aluminum oxide, aluminum hydroxide, silicon dioxide, diatomaceous earth, siliceous earth, quartz, silica gel, talc, kaolin, mica, perlite, feldspar, slate flour, calcium sulfate, barium sulfate, calcium carbonate, calcite, dolomite, glass or carbon. The fibers used may be organic or inorganic in nature and may also be used as reinforcing agents. Additional examples of pigments or fillers can be found, for example, in U.S. Pat. No. 4,795,796. Flame retardants such as aluminum or magnesium hydroxide and delustering agents, such as silicas, may also be dispersed and stabilized particularly well by the wetting and dispersing agents according to the invention, insofar as the compounds according to the invention are not already used in the customary additive quantities for this purpose.

The amine adducts according to the invention are also especially suitable for producing solids concentrates, such as pigment concentrates. For this purpose, the amine adducts according to the invention are provided in a carrier medium such as organic solvents, plasticizers and/or water, and the solids to be dispersed are added under agitation. In addition, these concentrates may contain binders and/or other auxiliaries. With the amine adducts according to the invention, however, it is possible in particular to produce stable, binder-free pigment concentrates. It is also possible to produce free-flowing solid concentrates from pigment press cakes using the amine adducts according to the invention. In this process, the compound according to the invention is mixed into the press cake, which may also contain organic solvent, plasticizer and/or water, and the mixture thus obtained is dispersed. The solid concentrates produced in various ways can then be incorporated into different substrates, such as alkyd resins, polyester resins, acrylate resins, polyurethane resins or epoxy resins. However, pigments may also be dispersed directly into the amine adducts according to the invention without solvents and are then especially suitable for pigmentation of thermoplastic and duroplastic plastic formulations.

Depending on the application area, the amine adducts according to the invention are used in quantities such that in the product, which is of ultimate interest for further application, a fraction of the wetting and dispersing agent according to the invention of 0.01 to 10 wt. %, based on the total quantity of the respective product, is present. Higher fractions are also possible.

Based on the solid, for example the pigment, to be dispersed, the wetting agent and dispersant according to the invention is used in a quantity of preferably 0.5 to 100% by weight. If difficult to disperse solids are used, the quantity of the wetting agent and dispersant according to the invention definitely can be greater. The quantity of dispersant generally depends on the surface area of the dispersible substance that is to be covered. The pigment involved, for example, may also be significant. In general, it can be said that less dispersant is usually required for dispersing inorganic pigments than for organic pigments, since the latter usually have a higher specific surface and consequently a larger amount of dispersant is necessary. Typical addition rates of the wetting agents and dispersants for inorganic pigments are, for example, 1 to 20% by weight, and for organic pigments, 10 to 50% by weight, in each case based on the solid to be dispersed, especially the pigment. In the case of very fine-particulate pigments (for example some lamp-blacks), addition rates of 30 to 90% or more are necessary. Criteria for adequate pigment stabilization may be, for example, luster and transparency of the coating composition or the degree of floating. The dispersion of the solids can take place as an individual milling or as a mixed milling with several pigments simultaneously; as a rule, the best results are achieved with individual millings. When mixtures of various solids are used, increased agglomeration in the liquid phase may occur because of opposite charges on the solid surfaces. In these cases, when the amine adducts according to the invention are used, the same type of charge, usually a positive one, on all particles can often be achieved, and thus instabilities due to charge differences can be avoided. The dispersants achieve their optimal effect when added to the ground material, especially if at first the solid to be dispersed is mixed only with the additive and optionally solvents (("premix"), since in that case the additive preferentially adsorbs on the surface of the solid without having to compete with the binder polymers. In practice, however, this procedure is only necessary in exceptional cases. If necessary the amine adducts according to the invention may also be added subsequently (as so-called "post-additives"), for example to solve floating or flocculation problems in a batch that has already been made into a lacquer. As a rule, higher additive addition rates are necessary in this case.

The products, especially the coating compositions or lacquers in which the amine adducts according to the invention are ultimately supposed to produce their effects, can also contain an organic polymer as the binder. Such binders are known to the person skilled in the art. This at least one binder can, for example, be introduced via a lacquer system which is mixed for example with a pigment concentrate containing the amine adducts according to the invention, so that the product under consideration is a pigment lacquer. Also possible are other pigmented and/or solids-containing products, for example plastics, sealants and additional products based on an organic polymer matrix known to the person skilled in the art. A product may be regarded as a system that contains a polymeric resin or organic polymer as binder and consequently is capable of forming such an organic, polymeric matrix (for example a pigment concentrate) by simply mixing with a component containing a binder. Examples of products that may be used, possibly but not exclusively known to the person skilled in the art, are alkyd resins, polyester resins, acrylate resins, polyurethane resins, cellulose nitrates, cellulose acetobutyrates, melamines, chlorinated rubbers and/or epoxy resins. Examples of water-based coatings are cathodic or anodic electrodip lacquer finishes, e.g., for auto bodies. Further examples are polishes, silicate paints, dispersion paints, water-based lacquers based on water-thinnable alkyds, alkyd emulsions, hybrid systems, 2-component systems, polyurethane and acrylate dispersions.

Both 1-component systems and 2-component systems are possible. In the latter case, polyisocyanates, melamine resins and/or polyamide resins are present as the typical crosslinking agents, familiar to the person skilled in the art, in a second component. Product systems, especially coating compositions, which contain an acrylate resin as binder are preferred. An additional variant involves a 2-component (2C) coating composition or a 2C lacquer, which contains an epoxy resin in the binder component and a polyamide resin in the cross-linker component.

The coating compositions preferred as products can be water-based or solvent-based. Water-based means that the coating composition chiefly contains water as the solvent. In particular, in a water-based coating composition, no more than 10 wt. % organic solvent, based on the total quantity of solvents, are present in the coating composition. A solvent-based coating composition is one that contains no more than 5% by weight of water, preferably no more than 2% by weight of water, based on the total quantity of solvents.

Additional product components to consider as examples are photoinitiators, defoamers, wetting agents, film-forming aids such as cellulose derivatives (for example cellulose nitrate, cellulose acetate, cellulose acetobutyrate), reactive diluents, leveling agents, dispersants, and/or rheology-controlling additives.

The production of the pigment concentrates and coating composition preferred as products is performed using the method customary for the person skilled in the art. The known methods are used, for example stepwise addition under agitation and mixing the components of the coating composition in the usual mixing units, such as agitator vessels or dissolvers.

Coatings or lacquer layers can be produced using the preferred pigment concentrates and coating compositions. The coating is prepared using application techniques commonly employed by the person skilled in the art on a substrate, followed by hardening.

The application is performed, for example, by the familiar spraying, squirting, painting, rolling, casting, soaking and/or dipping methods. Following application of the coating composition to a substrate, the hardening or drying is performed by usual methods. For example, the applied coating composition can be hardened by physical drying, thermally and/or actinic radiation (radiation-hardening), preferably UV radiation as well as electron bombardment. Thermal hardening can take place for example in the range from about 10° C. to about 400° C., depending on the type of coating composition and/or substrate. The hardening time is also dependent in the individual case, for example, on the type of hardening process (thermal or actinic), the type of coating composition used and/or the substrates. The substrate may be moving or still.

In addition to the above-described use as a dispersant and/or coating agent for powdered and fibrous solids, the amine adducts according to the invention can also be used as viscosity reducers and compatibility enhancers in synthetic resins. Examples of such synthetic resins are the so-called "sheet molding compounds" (SMC) and "bulk molding compounds"(BMC), which consist of unsaturated polyester resins with high filler and fiber contents. Their manufacture and processing is described, for example, in U.S. Pat. No. 4,777,195. One problem with SMC and BMC synthetic resin mixtures consists of the fact that often polystyrene (PS) is added to the formula to reduce shrinking while processing. PS is not compatible with the unsaturated polyester resins used, and separation of the components occurs. When PS-filled SMC or BMC mixtures are used, the amine adducts according to the invention, because of their good dispersion qualities, can also bring about compatibility between PS and unsaturated polyester resin, increasing the shelf life and processing reliability of such mixtures.

For example, with the aid of the amine adducts of the invention, phase mediating effects can be achieved, for example, in incompatible polyol mixtures, polyol-isocyanate mixtures or polyol-blowing agent mixtures (used, for example, in manufacturing polyurethane).

In the following, the invention will be explained further based on examples.

In substances that lack molecular uniformity, the indicated molecular weights represent averages. When titratable end groups are present, such as acid, hydroxy or amino groups, the molecular weights are determined by end-group determination by ascertaining the acid number, OH number or the amine number. In the case of compounds to which an end group determination is not applicable, the molecular weight is determined by light scattering.

Unless performed differently, statements in parts refer to parts by weight and statements in percentages, to percentages by weight.

Preparation Procedures:

a) General Instructions for Producing Polyester Components from Lactones:

In a four-necked flask with agitator, thermometer, reflux cooler and nitrogen inlet tube, substances R1a) to T1c) are placed and heated to 100° C. with agitation under N2 gas.

Then the catalyst is added and heating under N2 gas is continued to T1. Agitation is continued at this temperature until the FK>99% is achieved.

b) General Instructions for Producing Polyester Components from Hydroxycarboxylic Acids:

In a four-necked flask equipped with agitator, thermometer, reflux cooler and nitrogen inlet tube, substances R1a) to R1c) are placed and heated to 100° C. with agitation under N2 gas.

At 100° C. the catalyst is added and a distillation trap is attached.

Heating is continued, and the water released is removed by the distillation trap.

The reaction temperature is adapted to the water released and goes to T1.

When no further water is released, the reaction is complete.

c) General Instructions for Producing Polyester Components from Diols and Dicarboxylic Acids:

In a four-necked flask equipped with agitator, thermometer, reflux cooler, distillation trap and nitrogen inlet tube, substances R1a) to R1c) are weighed in together with the catalyst and heated under N2 gas. The water of reaction produced is collected via the distillation trap.

The reaction temperature is adapted to the water released and goes to T1. When no further water is released, the reaction is complete.

d) General Instructions for Producing Intermediates:
Reaction of Polyesters with Amines with Splitting Off of Water:

In a four-necked flask equipped with agitator, thermometer, reflux cooler, distillation trap and nitrogen inlet tube, substances R2a) and R2b) are placed and heated under N2 gas. The water of reaction produced is collected via the distillation trap. The reaction temperature is adapted to the water released and goes to T1. When no further water is released, the reaction is complete.

e) General Instructions for Producing Intermediates:
Reaction of Polyesters with Amines with Splitting Off of Water:

In a four-necked flask equipped with agitator, thermometer, reflux cooler and nitrogen inlet tube, reaction component R2a) is placed and heated under N2 gas to reaction temperature T1. Reaction component R2b) is added during the preset time X1. The consecutive reaction period is 1 h at T1.

f) General Production Instructions According to Reaction Variant i):

In a four-necked flask equipped with agitator, thermometer, reflux cooler and nitrogen inlet tube, reaction component R3a) is placed and heated under N2 gas to T2. The consecutive reaction period is over time X2 at T2.

Then reaction component 3b) is added. Agitation is performed for time X1 at T1. Then reaction component 3c) is added and heating is performed under N2 gas to T2. The consecutive reaction period is over period X2 at T2. In the case of a further reaction with a raw material 3d), this is added 1 h after 3c) and the consecutive reaction period is added appropriately.

g) General Production Instructions According to Reaction Variant i) with Intermediate Product:

In a four-necked flask equipped with agitator, thermometer, reflux cooler and nitrogen inlet tube, reaction component 3a) is placed and heated to 100° C. with agitation under N2 gas.

Then reaction component 3b) is added at 100° C., then heating to T1 and agitation for time X1 is performed.

h) General Production Instructions According to Reaction Variant ii):

In a four-necked flask equipped with agitator, thermometer, reflux cooler and nitrogen inlet tube, reaction component 3a) is placed and heated to T1. Component 3b) is added in X1. After addition, 0.5 h of consecutive reaction takes place at T1. Then reaction component 3c) is added, and heating is performed under N2 gas to T2. This is followed by a consecutive reaction time X2 at T2.

i) General Production Instructions According to Reaction Variant (ii) with Intermediate Product:

In a four-necked flask equipped with agitator, thermometer, reflux cooler and nitrogen inlet tube, reaction component 3a) is placed and heated to T1. Component 3b) is added in time period X1. Then heating to T2 is performed under N2 gas. The consecutive reaction time at T2 is then X2.

j) General Production Instructions According to Reaction Variant iii):

In a four-necked flask equipped with agitator, thermometer, reflux cooler and nitrogen inlet tube, reaction component 3a) is placed and heated to T1 under N2 gas. Then reaction components 3b) and 3c) are added separately each in X1. Then heating to T2 is performed and the mixture is heated at T2 for the time period X2.

k) General Production Instructions According to Reaction Variant iv):

In a four-necked flask equipped with agitator, thermometer, reflux cooler and nitrogen inlet tube, reaction components 3a) and b) are placed and heated to T1 under N2 gas.

Component 3c) is added in X1. Then 0.5 h of consecutive reaction takes place at T1. Then reaction component 3d) is added and heating under N2 gas is continued further to T2. Then consecutive reaction X2 is performed at T2 under N2 gas.

Preparation of a Comparison Example EX1 not According to the Invention:

In a four-necked flask equipped with an agitator, thermometer, reflux cooler and inlet tube, 4.4 parts of hydroxyethylacrylate with 66.00 parts caprolactone and 28.3 parts valerolactone with 0.01% monobutyltin oxide and 0.1% hydroquinone are heated under an air atmosphere and agitation to 120° C. to obtain a polyester with Mn 2100. After 12 h at 120° C., cooling to 65° C. is performed. Then 6.91 parts polyethyleneimine, MW 2000, are added. The reactants are then agitated for 2 h at 65° C.

Preparation of a Comparison Example EX2 not According to the Invention, Comparable to E14, but without Component C:

In a four-necked flask equipped with an agitator, thermometer, reflux cooler and inlet tube, 94.3 parts of polyester B10 are placed, heated to 100° C., and 5.7 parts of a polyethyleneimine with MW 2000 are added. Then heating is performed to 140° C. and agitation continued for 2 h at this temperature.

| Bsp | HV | R 1a) | % R 1a) | R 1b) | % R 1b) | R 1c) | % R 1c) | Kat | % | T1 | MG |
|---|---|---|---|---|---|---|---|---|---|---|---|
| B1 | a) | LS | 20.05 | CAPA | 79.80 | | | ZB | 0.15 | 190.00 | 1000 |
| B2 | a) | HSS | 22.40 | CAPA | 77.50 | | | ZB | 0.10 | 190.00 | 1500 |
| B3 | a) | LS | 14.90 | CAPA | 85.00 | | | ZB | 0.10 | 190.00 | 1300 |
| B4 | a) | RFS | 19.90 | CAPA | 79.80 | | | ZB | 0.30 | 190.00 | 1500 |

-continued

| Bsp | HV | R 1a) | % R 1a) | R 1b) | % R 1b) | R 1c) | % R 1c) | Kat | % | T1 | MG |
|---|---|---|---|---|---|---|---|---|---|---|---|
| B5 | a) | RFS | 15.40 | CAPA | 84.30 | | | ZB | 0.30 | 190.00 | 2000 |
| B6 | a) | LS | 11.30 | CAPA | 77.30 | VAL | 11.30 | IPT | 0.50 | 190.00 | 1770 |
| B7 | a) | LS | 14.00 | CAPA | 71.70 | VAL | 14.00 | IPT | 0.30 | 190.00 | 1400 |
| B8 | a) | LS | 19.90 | CAPA | 59.80 | VAL | 19.90 | IPT | 0.40 | 190.00 | 1000 |
| B9 | a) | HSS | 32.40 | CAPA | 67.30 | | | ZB | 0.30 | 190.00 | 1000 |
| B10 | a) | LS | 9.88 | CAPA | 90.10 | | | ZB | 0.02 | 190.00 | 2000 |
| B11 | a) | LS | 13.70 | CAPA | 85.80 | | | IPT | 0.50 | 190.00 | 1500 |
| B12 | b) | RFS | 99.00 | | | | | PTS | 1.00 | 170.00 | 1500 |
| B13 | b) | HSS | 99.00 | | | | | PTS | 1.00 | 170.00 | 1200 |
| B14 | b) | RFS | 49.50 | HSS | 49.50 | | | PTS | 1.00 | 170.00 | 3000 |
| B15 | c) | LS | 22.00 | BDO | 29.50 | ADS | 48.20 | DBS | 0.30 | 160.00 | 900 |
| B16 | c) | ADS | 62.80 | BDO | 36.20 | | | PTS | 1.00 | 160.00 | 3500 |
| B17 | c) | PSA | 66.40 | BDO | 33.40 | | | DBS | 0.20 | 160.00 | 1300 |
| B18 | a) | LA | 8.7 | Capa | 73.8 | VAL | 17.3 | IPT | 0.2 | 180.0 | 2100 |

Bsp = example;
HV = production instructions;
KAT = catalyst;
T(number) temperature as described in the HV;
LS = lauric acid;
HSS = hydroxystearic acid,
RFS = castor oil fatty acid;
CAPA = epsilon-caprolactone;
VAL = delta-valerolactone;
BDO = butanediol;
ADS = adipic acid;
ZB = zirconium butylate;
PT = isopropyl titanate;
PTS = p-toluenesulfonic acid

| Bsp | HV | R 2a) | % R2a | R 2b | % R2b | T1 | X1 |
|---|---|---|---|---|---|---|---|
| Z1 | d) | BT2 | 94.00 | TEPA | 6.00 | 160° C. | 180 |
| Z2 | d) | BT2 | 93.50 | DETA | 6.50 | 160° C. | 150 |
| Z3 | d) | BT2 | 93.90 | PEI 300 | 6.10 | 160° C. | 150 |
| Z4 | d) | BT3 | 94.70 | TETA | 5.30 | 160° C. | 180 |
| Z5 | e) | PEI 1200 | 62.30 | PGE | 37.70 | 100 | 150 |
| Z6 | e) | DETA | 28.60 | EPN | 71.40 | 100 | 120 |
| Z7 | e) | TETA | 44.20 | EPN | 55.80 | 100 | 120 |
| Z8 | e) | PEI 300 | 61.70 | PGE | 38.30 | 100 | 150 |
| Z9 | e) | TEPA | 60.00 | EPN | 40.00 | 100 | 150 |

X(number) = reaction time described in the HV;
TETA = triethylenetetramine;
TEPA = tetraethylenepentamine;
DETA = diethylenetriamine;
PEI (number) = polyethyleneimine (MW);
IPA = n-3-aminopropylimidazole;
EPN = epoxypropylneodecanoate;
PGE = phenylglycidyl ether.

| Bsp | HV | R 3a) | % 3a) | R 3b) | % 3b) | Rc) | % R3c) | Rd) | % R3d) | T1 [° C.] | X1 [min] | T2 [° C.] | X2 [min] |
|---|---|---|---|---|---|---|---|---|---|---|---|---|---|
| E1 | i) | B1 | 81.70 | Z6 | 18.30 | | | | | 100 | 20 | 140 | 120 |
| E2 | i) | B2 | 90.60 | Z8 | 9.40 | | | | | 100 | 20 | 140 | 120 |
| E3 | i) | B2 | 94.80 | Z7 | 5.20 | | | | | 100 | 20 | 140 | 120 |
| E4 | f) | B2 | 84.50 | PEI 1200 | 7.70 | EPN | 7.80 | | | 100 | 30 | 140 | 180 |
| E5 | h) | PEI 2000 | 8.70 | EPN | 8.90 | B3 | 82.40 | | | 100 | 120 | 140 | 180 |
| E6 | h) | PEI 1200 | 7.70 | EPN | 7.80 | B4 | 84.50 | | | 100 | 120 | 140 | 120 |
| E7 | i) | B4 | 87.00 | Z9 | 13.00 | | | | | 100 | 20 | 130 | 180 |
| E8 | i) | B5 | 91.70 | Z5 | 8.30 | | | | | 100 | 20 | 130 | 180 |
| E9 | i) | B6 | 88.80 | Z9 | 11.20 | | | | | 100 | 20 | 140 | 120 |
| E10 | i) | B7 | 84.60 | Z9 | 15.40 | | | | | 100 | 20 | 140 | 120 |
| E11 | h) | PEI 1200 | 8.70 | EPN | 8.80 | B7 | 82.50 | | | 100 | 120 | 120 | 180 |
| E12 | h) | PEI 800 | 6.80 | PC | 3.40 | B8 | 86.40 | PGE | 3.4 | 100 | 120 | 140 | 180 |
| E13 | i) | B9 | 81.70 | Z9 | 18.30 | | | | | 100 | 20 | 140 | 120 |
| E14 | k) | B10 | 60.00 | PEI 2000 | 9.80 | PGE | 11.60 | B10 | 18.60 | 100 | 60 | 120 | 180 |
| E15 | i) | B11 | 87.00 | Z9 | 13.00 | | | | | 100 | 20 | 140 | 180 |
| E16 | h) | PEI 2000 | 5.70 | EPN | 3.00 | B11 | 91.30 | | | 100 | 120 | 140 | 180 |
| E17 | i) | Z1 | 92.40 | EPN | 7.60 | | | | | 80 | 60 | | |
| E18 | i) | Z2 | 86.00 | EPN | 14.00 | | | | | 80 | 60 | | |
| E19 | i) | Z3 | 93.30 | EPN | 6.70 | | | | | 80 | 60 | | |
| E20 | i) | Z4 | 95.80 | EPN | 4.20 | | | | | 80 | 60 | | |

-continued

| Bsp | HV | R 3a) | % 3a) | R 3b) | % 3b) | Rc) | % R3c) | Rd) | % R3d) | T1 [°C.] | X1 [min] | T2 [°C.] | X2 [min] |
|---|---|---|---|---|---|---|---|---|---|---|---|---|---|
| E21 | j) | B10 | 85.00 | DMDPTA | 8.10 | PGE | 6.90 | | | 60 | 60 | 120 | 240 |
| E22 | f) | B14 | 93.60 | PEI 300 | 3.2 | PC | 2.0 | CGE | 1.2 | 100 | 30 | 140 | 180 |
| E23 | f) | B16 | 95.60 | DETA | 1.7 | EPN | 2.70 | | | 100 | 30 | 120 | 240 |
| E24 | f) | B17 | 88.50 | DETA | 3.9 | EPN | 7.60 | | | 100 | 30 | 120 | 240 |
| E25 | j) | B1 | 65.80 | TETA | 9.70 | EPN | 25.50 | | | 100 | 60 | 120 | 240 |
| E26 | k) | B15 | 90.30 | PEI 300 | 6.5 | EPN | 2.30 | MSA | 1.20 | 100 | 30 | 120 | 120 |
| E27 | f) | B18 | 78.6 | PEI 2000 | 9.7 | EPN | 11.7 | | | 100 | 30 | 140 | 120 |
| E28 | h) | PEI 1200 | 7.70 | CGE | 7.80 | B4 | 84.50 | | | 100 | 120 | 140 | 120 |

MSA = maleic anhydride;;
PC = propylene carbonate,
DMDPTA = dimethyldipropylenetriamine,
CGE = o-cresylglycidyl ether Applications Technology Testing The amine adducts (polymers) according to the invention are used, among other things, as wetting and dispersing agents for producing pigment concentrates, paint systems and ink jet systems.

Applications Technology Testing in Ink Jet Systems:

Operating Equipment:

Shaker: LAU Paint Shaker DAS H [/A] 200-K

Luster/haze measurement:
　Trigloss, (Byk Gardner)
　Measurement angle 20°

Substances for applications technology testing:

Vinnol solution: 75% butylglycol acetate+2-% cyclohexanone+5% Vinnol 15/45;

Vinnol 15/45: Copolymer of approx. 85% by weight vinyl chloride and approx. 15% by weight vinyl acetate; manufacturer: Wacker Novoperm P-M3R: P.Y. 139

InkJet Magenta E02: P.R. 122 Type A

Irgalite Blue P.B. 15:4, Type B

NiPex 90 p.Bk-7, pH=9.0

Method of Operation:
　For producing the pigment concentrates: weigh items 1-4 into a 100 ml glass flask and mix. Then add 100 g zirconium beads (0.4-0.5 mm).
　Disperse premixed pigment concentrates for 960 minutes in a vibrating shaker at cooling level 3
　Screen pigment concentrate into 50 ml glass bottles.
　After storage overnight and after storage for one week at 40° C., determine the viscosities using the Stress Tech instrument.
　The concentrates are applied to PU film with 25 μm wet film layer thickness.
　The color intensity and transparency are evaluated visually on the film; for the luster and haze measurement, the films are placed on black cardboard and measured.

Formulation 1-Pigment Concentrate Based on Novoperm Yellow P-M3R

| Item No. | Raw material | [g] |
|---|---|---|
| 1 | VINNOL solution | 15.0 |
| 2 | Butylglycol acetate | 25.9 |
| 3 | Additive | 2.1 |
| 4 | Novoperm Yellow P-M3R | 7.0 |
| | | 50.0 |
| Additive addition rate [% s.o.p.] | | 30.0 |

Formulation 2-Pigment concentrate based on Ink Jet Magenta E 02

| Item No. | Raw material | [g] |
|---|---|---|
| 1 | VINNOL Solution | 15.0 |
| 2 | Butylglycol acetate | 28.5 |
| 3 | Additive | 1.5 |
| 4 | Ink Jet Magenta E 02 | 5.0 |
| | | 50.0 |
| Additive addition rate [% s.o.p.] | | 30.0 |

Formulation 3-Pigment Concentrate Based on Irgalite Blue GLVO

| Item No. | Raw material | [g] |
|---|---|---|
| 1 | VINNOL solution | 15.0 |
| 2 | Butylglycol acetate | 27.2 |
| 3 | Additive | 1.8 |
| 4 | Irgalite Blue GLVO | 6.0 |
| | | 50.0 |
| Additive addition rate [% s.o.p.] | | 30.0 |

Formulation 4-Pigment Concentrate Based on NiPex 90

| Item No. | Raw material | [g] |
|---|---|---|
| 1 | VINNOL solution | 15.0 |
| 2 | Butylglycol acetate | 26.0 |
| 3 | Additive | 3.0 |
| 4 | NiPex 90 | 6.0 |
| | | 50.0 |
| Additive addition rate [% s.o.p.] | | 50.0 |

Results:

Color intensity+transparency: 1-5 (1=good, 5=poor)

| Additiv | Visko (mPas) | Visko 1 W 40° C. (mPas) | Glanz | Haze | Farbstärke | Transparenz | Visko (mPas) | Visko 1 W 40° C. (mPas) | Glanz | Haze | Farbstärke | Transparenz |
|---|---|---|---|---|---|---|---|---|---|---|---|---|
| | | | Novoperm P-M3R | | | | | | Ink Jet Magents EO2 | | | |
| EX1* | 19 | 29 | 89 | — | 5 | 4 | 418 | 489 | 91 | — | 4 | 4 |
| E4 | 11 | 14 | 95 | — | 1 | 1 | 309 | 386 | 97 | — | 2 | 2 |
| E7 | 16 | 18 | 92 | — | 2 | 1 | 323 | 396 | 92 | — | 2 | 2 |
| E19 | 13 | 15 | 95 | — | 1 | 2 | 311 | 401 | 93 | — | 2 | 2 |
| | | | Irgalite Blue | | | | | | NiPex 90 (p.Bk-7, pH = 9.0) | | | |
| EX1* | 164 | 167 | 92 | — | 3 | 3 | 625 | 885 | 93 | 31 | 3 | — |
| E4 | 103 | 135 | 96 | — | 1 | 1 | 31 | 94 | 99 | 9 | 1 | — |
| E7 | 142 | 148 | 97 | — | 1 | 2 | 174 | 324 | 96 | 21 | 2 | — |
| E19 | 136 | 153 | 98 | — | 2 | 2 | 145 | 214 | 99 | 11 | 1 | — |

*Not according to invention
Additiv = additive,
Visko = viscosity,
Glanz = luster,
Haze = haze,
Farbstärke = color intensity,
Transparency.

Conclusion of Tests in Ink-Jet Systems:

The particularly good quality of the polymers according to the invention is demonstrated by their low viscosity, color intensity, transparency and good luster.

An additional particular advantage of the polymers consists of the particularly good incorporation in the binder solution.

Applications Technology Testing in Pigment Concentrates:
Working Equipment:
Dispermat CV
Trigloss, (Byk Gardner)
Scandex Shaker
Substances for Applications Technology Testing:
Lamp black FW 200→PB 7
Laropoal A81→Aldehyde resin, manufacturer BASF
Paraloid DM 66→Thermoplastic acrylate resin TPA): manufacturer DOW
Macrynal SM 510→Acrylate resin 70% in; manufacturer Cytec
Desmodur N75→Aliphatic isocyanate, 75% in methoxypropyl acetate; manufacturer Bayer
Setalux 1756 V V65→Acrylate resin 65%% in solvent naphtha; manufacturer Nuplex
Setamine US 138 0→Melamine resin 70% in n-butanol, manufacturer Nuplex
Epikote 1001→Epoxy resin 75% in xylene, manufacturer Brenntag
Aradur 115→Polyamidoamine; manufacturer Huntsman
Dowanol PMA→Methoxypropyl acetate, manufacturer DOW
Dowanol PM→Methoxypropanol, manufacturer DOW
Solvesso 100→Aromatic solvent from Exxon
BYK 306/310/325→Leveler additive, manufacturer BYK
Method of Operation:
Preparation of the Pigment Concentrates:
  Weigh in the lacquer constituents in the indicated order (stir briefly manually after each addition)
  Dispermat CV/60 minutes/10,000 rpm (23 m/s) at 40° C. material to be ground/glass beads (0.8-1.2 mm) 1:1 ratio (by weight)
  Screen out the glass beads after dispersing
  Visually evaluate the viscosity (after preparation, after 1 day)

Preparation of the Lacquer:
  Incorporate the pigment concentrates into the different lacquer systems with a Scandex vibrating shaker for 5 min
  Pour the diluted lacquer onto PE film
  Make an overall visual evaluation of transparency and optical properties→1-5; (1=good, 5=poor)
  Measure luster with Trigloss
Formulation of Pigment Concentrate
12.5% carbon black with 80% additive solid on pigment

| Raw material | [g] |
|---|---|
| Laropal A81 60% in methoxypropyl acetate | 54.1 |
| Dowanol PMA | 23.4 |
| Additive 100% | 10.0 |
| Lamp black FW 200 | 12.5 |
| (pigment/binder ratio 1/3.5) | |
| | 100.0 |

Formulation of Pigment Concentrate
15% carbon black with 60% additive solid on pigment

| Raw material | [g] |
|---|---|
| Laropal A81 60% in methoxypropyl acetate | 53.1 |
| Dowanol PMA | 22.9 |
| Additive 100% | 9.0 |
| Lamp black FW 200 | 15.0 |
| (pigment/binder ratio 1/3.5) | |
| | 100.0 |

Formulations of Clear Lacquer with Finalization of the Pigment Concentrate in Clear Lacquer
TPA

| Paraloid B66 | |
|---|---|
| Paraloid B66 (50% in xylene) | 70.0 |
| Diisodecyl phthalate | 2.0 |
| Xylene | 21.8 |

| Paraloid B66 | |
|---|---|
| Dowanol PMA | 6.0 |
| BYK-306 | 0.2 |
| | 100.0 |

| | |
|---|---|
| Clear lacquer (Paraloid B66) | 27.5 |
| Pigment concentrate | 2.5 |
| | 30.0 |
| Incorporation of pigment concentrate on vibrating shaker | |
| Xylene | 30.0 |

2K-PUR

| Macrynal SM 510/Desmodur N | |
|---|---|
| Macrynal SM 510 (70% in butyl acetate) | 75.0 |
| Dowanol PMA | 5.0 |
| Solvesso 100 | 5.0 |
| Xylene | 6.9 |
| Butyl acetate | 8.0 |
| BYK-306 | 0.1 |
| | 100.0 |

| Hardener solution 2:1 (weight) | |
|---|---|
| Desmodur N75 | 50.0 |
| Butyl acetate | 17.5 |
| Solvesso 100 | 17.5 |
| Dowanol PMA | 5.0 |
| Xylene | 10.0 |
| BYK-306 | 0.1 |
| | 100.0 |

| | |
|---|---|
| Clear lacquer (Macrynal SM 510/Desmodur N | 20.0 |
| Pigment concentrate | 2.0 |
| | 22.0 |
| Incorporation of pigment concentrate on vibrating shaker | |
| Hardener solution | 10.0 |

Acrylate/Melamine System

| Setalux 1756/Setamine US 138 | |
|---|---|
| Setalux 1756 VV 65 | 60.0 |
| Setamine US 138 | 24.0 |
| Solvesso 100 | 8.0 |
| Xylene | 7.8 |
| BYK-310 | 0.2 |
| | 100.0 |

| | |
|---|---|
| Clear lacquer (Setalux 1756/Setamine US 138) | 25.0 |
| Pigment concentrate | 2.0 |
| | 27.0 |
| Incorporation of pigment concentrate on vibrating shaker | |
| Solvesso 100 | 3.0 |

After 15 [min] flash-off time, the applied lacquer is baked on for 20 min at 130° C.

2K Epoxide

| Epikote 1001/Aradur 115 × 70 | |
|---|---|
| Epikote 1001 (75% in xylene) | 60.0 |
| Xylene | 17.0 |
| Dowanol PM | 12.8 |
| n-Butanol | 10.0 |
| BYK-325 | 0.2 |
| | 100.0 |

| Hardener solution 2:1 (weight) | |
|---|---|
| Aradur 115 × 70 | 35.5 |
| Xylene | 6.0 |
| Dowanol PM | 4.0 |
| n-Butanol | 4.5 |
| | 50.0 |

| | |
|---|---|
| Clear lacquer (Epikote 1001/Aradur 115 × 70) | 20.0 |
| Pigment concentrate | 2.0 |
| | 22.0 |
| Incorporation of pigment concentrate on vibrating shaker | |
| Hardener solution | 10.0 |

Results:

Appearance in lacquer system: 1-5 (1=good, 5=poor)

Visco.: hv=high-viscosity; mv=medium-viscosity; lv=low viscosity Appear.=appearance Pigment pastes with 12.5% carbon black and 80% additive solid on pigment

| Additive | Visco. of paste on dispersion, visual | Visco. of paste after 1 day, visual | Baking lacquer/ acrylate | | Baking lacquer/ alkyd | | 2K-PUR. SM 510 | | 2K-PUR/Set. 1573 | | 2K-epoxy | |
|---|---|---|---|---|---|---|---|---|---|---|---|---|
| | | | Appear. | Luster | Appear. | Luster | Appear. | Luster | Appear. | Luster | Appear. | Luster |
| EX1* | hv | very hv | 4 | 78 | 3 | 85 | 5 | 79 | 4 | 84 | 5 flocculated | 85 |
| EX2* | hv | hv | 4 | 81 | 4 | 83 | 4 | 85 | 3 | 85 | 4 | 82 |

-continued

| Additive | Visco. of paste on dispersion, visual | Visco. of paste after 1 day, visual | Baking lacquer/ acrylate Appear. | Luster | Baking lacquer/ alkyd Appear. | Luster | 2K-PUR. SM 510 Appear. | Luster | 2K-PUR/Set. 1573 Appear. | Luster | 2K-epoxy Appear. | Luster |
|---|---|---|---|---|---|---|---|---|---|---|---|---|
| E2 | mv | mv | 2 | 89 | 2 | 94 | 1 | 90 | 2 | 91 | 2 | 88 |
| E4 | mv | lv | 1 | 86 | 1 | 94 | 1 | 89 | 1 | 92 | 2 | 94 |
| E5 | mv | mv | 1 | 96 | 2 | 89 | 1 | 91 | 2 | 92 | 2 | 98 |
| E8 | lv | lv | 1 | 92 | 2 | 91 | 1 | 94 | 1 | 89 | 1 | 92 |
| E14 | very lv | lv | 1 | 94 | 1 | 95 | 1 | 92 | 1 | 93 | 2 | 89 |
| E27 | very lv | very lv | 1 | 98 | 1 | 96 | 1 | 95 | 1 | 98 | 1 | 95 |

*Not according to invention

Pigment pastes with 15% carbon black and 60% additive solid on pigment

| Additive | Visco. of paste on dispersion, visual | Visco. of paste after 1 day, visual | Baking lacquer/ acrylate Appear. | Luster | Baking lacquer/ alkyd Appear. | Luster | 2K-PUR. SM 510 Appear. | Luster | 2K-PUR/Set. 1573 Appear. | Luster | 2K-epoxy Appear. | Luster |
|---|---|---|---|---|---|---|---|---|---|---|---|---|
| EX1* | cannot be made | cannot be made | — | — | — | — | — | — | — | — | — | — |
| EX2* | cannot be made | cannot be made | — | — | — | — | — | — | — | — | — | — |
| E2 | mv | hv | 2 | 87 | 3 | 89 | 3 | 84 | 2 | 90 | 3 | 88 |
| E4 | lv | mv | 3 | 82 | 2 | 93 | 2 | 87 | 1 | 87 | 2 | 90 |
| E5 | mv | mv | 2 | 89 | 2 | 91 | 3 | 89 | 2 | 86 | 3 | 86 |
| E8 | mv | mv | 2 | 86 | 3 | 89 | 2 | 91 | 2 | 89 | 1 | 89 |
| E14 | lv | lv | 1 | 94 | 2 | 87 | 1 | 92 | 2 | 91 | 3 | 85 |
| E27 | very lv | lv | 1 | 96 | 1 | 95 | 1 | 94 | 1 | 94 | 1 | 91 |

Conclusions from Tests on Pigment Concentrates for Different Lacquer Systems:

The amine adducts according to the invention are characterized by particularly good compatibility in the various lacquer systems. Corresponding pigment pastes have low viscosities and can be incorporated excellently. It is possible without further effort to produce pigment pastes with higher pigment contents. The outstandingly good luster and the excellent shelf life of the pigment concentrates are particularly noteworthy.

The invention claimed is:

1. A process for preparing an amine adduct, in which a polyamine component (A), a polyester component (B) and a hydrocarbon component (C) are reacted in weight ratios of
(A):(B)=1:42 to 1:6 and
(A):(C)=1:10 to 10:1
in that according to reaction variant i) first a reaction intermediate (A-B) is produced from the polyamine component (A) and the polyester component (B), which is subsequently reacted with the hydrocarbon component (C) or
according to reaction variant ii) first a reaction intermediate (A-C) is formed from the polyamine component (A) and the hydrocarbon component (C) and this is subsequently reacted with the polyester component (B) or
according to reaction variant iii) the polyamine component (A) is reacted simultaneously with the polyester component (B) and the hydrocarbon component (C)
wherein
the polyamine component (A) is present in the form of at least one organic polyamine compound (A'), which in each case has at least three amino groups (A'+) selected from primary and secondary amino groups, in each case reactive with both the polyester component (B) and the hydrocarbon component (C),
the polyester component (B) is present in the form of at least one polyester compound (B'), which in each case contains no primary amino groups and no secondary amino groups, in each case has at least three ester groups, and in each case contains a coupling group (B'+) present as a carboxyl group or carboxylic acid anhydride group, reactive with primary and/or secondary amino groups, and
the hydrocarbon component (C) is present in the form of at least one branched or unbranched, saturated or unsaturated hydrocarbon compound (C') each having a linking group (C'+), in each case (C') having no primary amino groups, in each case having no secondary amino groups, in each case having no carboxyl groups and in each case having no carboxylic acid anhydride groups, and in each case (C') having an overall ratio of carbon atoms to hetero atoms of at least 2:1, wherein the hetero atoms are selected from the group of elements consisting of at least one of O, N, P, S, and Si, wherein the linking groups (C'+) in each case have the characteristic of reacting with primary amino groups with formation of secondary amino groups and/or with secondary amino groups with formation of tertiary amino groups, and also in each case are present in the form of an epoxy function of formula (I)

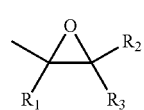

(I)

with R1, R2, and R3 in each case the same or different and each independently from one another is represented by H or by a saturated, branched or unbranched $C_1$-$C_{12}$ hydrocarbon moiety.

2. The process according to claim 1, wherein the reaction of (A), (B) and (C) is performed in weight ratios of
(A):(B)=1:25 to 1:7 and
(A):(C)=1:2 to 2:1.

3. The process according to claim 1, wherein at least 50% by weight of the polyester compounds (B') used are present in the form of linear, monocarboxy-functional caprolactone polyesters.

4. The process according to claim 3, wherein the at least 50% by weight of the polyester compounds (B') used are present in the form of linear, monocarboxy-functional caprolactone polyesters, which each has a weight-average molecular weight of 500 to 10,000.

5. The process according to claim 1, wherein the hydrocarbon component (C) contains at least 30% by weight of unsaturated $C_6$-$C_{50}$ hydrocarbon compounds (C'), which in each case contains at least one aryl and/or alkylaryl group.

6. The process according to claim 1, wherein the hydrocarbon component (C) contains at least 30% by weight of $C_{10}$-$C_{70}$ hydrocarbon compounds (C'), which in each case contains at least one branched alkyl and/or one branched alkenyl moiety.

7. The process according to claim 1, wherein components (A), (B) and (C) are used respectively in stoichiometric ratios such that altogether at least 50 mol %-of the totality of the reactive amino groups (A'+) of the polyamine compounds (A') used are reacted with the polyester compounds (B') and/or with the hydrocarbon compounds (C').

8. The process according to claim 1, wherein the amine adduct at room temperature is obtained in solid form, wherein (B) to (C) is reacted in a weight ratio of 2:1 to 50:1 and the amine adduct has a melting range of 30 to 200° C.

9. The process according to claim 1, wherein the polyester component (B) and the hydrocarbon component (C) do not react with one another under the reaction conditions of the reaction.

10. Amine adduct prepared according to the process of claim 1.

11. The amine adduct according to claim 10, which is suitable as a wetting and dispersing agent.

12. The amine adduct according to claim 10 having a weight-average molecular weight of 5,000 to 100,000.

13. Mixture of solids containing particles and/or fibers that have been treated with the amine adduct according to claim 10.

14. Lacquer and/or plastic formulation containing the amine adduct according to claim 10.

15. A process for utilizing the amine adduct, which is produced using the method according to claim 1, as an additive, in coatings, in lacquers, in plastics, in pigment pastes, in sealants, in cosmetics, in ceramics, in adhesives, in potting compound, in pigment-containing compounds for flat-screen technology, in filling compounds, in printing inks and in inks.

16. The process according to claim 15, wherein the amine adduct is a wetting and dispersing agent.

17. The process according to claim 1, wherein 70 to 100% by weight of the polyester compounds (B') used are present in the form of linear, monocarboxy-functional caprolactone polyesters.

18. The process according to claim 17, wherein the 70 to 100% by weight of the polyester compounds (B') used are present in the form of linear, monocarboxy-functional caprolactone polyesters, which each has a weight-average molecular weight of 500 to 10,000.

19. The process according to claim 17, wherein the 70 to 100% by weight of the polyester compounds (B') used are present in the form of linear, monocarboxy-functional caprolactone polyesters, which each has a weight-average molecular weight of 800 to 8,000.

20. The process according to claim 1, wherein the hydrocarbon component (C) contains 50 to 100% by weight of unsaturated $C_6$-$C_{50}$ hydrocarbon compounds (C'), which in each case contains at least one aryl and/or alkylaryl moiety.

21. The process according to claim 1, wherein the hydrocarbon component (C) contains 50 to 100% by weight of $C_{10}$-$C_{70}$ hydrocarbon compounds (C'), which in each case contains at least one branched alkyl and/or one branched alkenyl moiety.

22. The process according to claim 1, wherein components (A), (B) and (C) are used respectively in stoichiometric ratios such that altogether 70 to 100 mol % of the totality of the reactive amino groups (A'+) of the polyamine compounds (A') used are reacted with the polyester compounds (B') and/or with the hydrocarbon compounds (C').

* * * * *